UNITED STATES PATENT OFFICE.

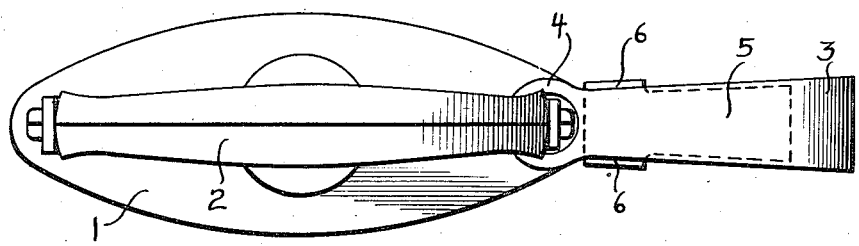
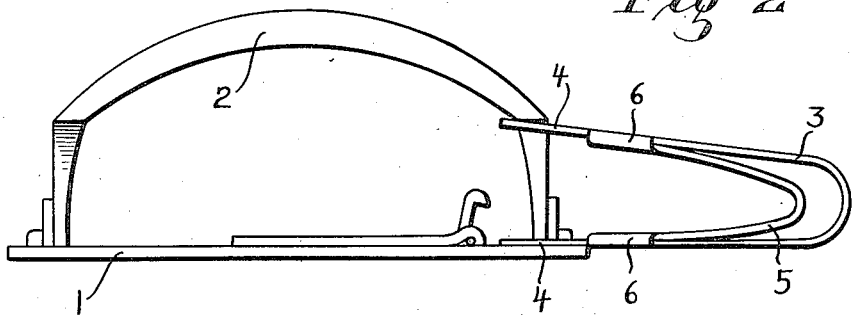
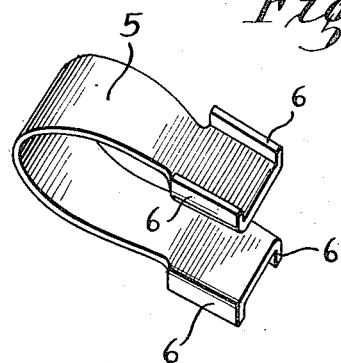

CARL A. CARLSON, OF ALPHA, MINNESOTA.

STIFFENING-SPRING FOR TRAPS.

1,260,143.                    Specification of Letters Patent.      Patented Mar. 19, 1918.

Application filed September 5, 1917.   Serial No. 189,811.

*To all whom it may concern:*

Be it known that I, CARL A. CARLSON, a citizen of the United States, residing at Alpha, in the county of Jackson and State of Minnesota, have invented new and useful Improvements in Stiffening-Springs for Traps, of which the following is a specification.

This invention relates to improvements in animal traps and especially with reference to the provision of a stiffening or auxiliary spring for use in connection with the spring which operates the jaws of a trap and for the purpose of stiffening and strengthening the trap spring so as to increase the efficiency of the trap and prevent an animal from getting away after its paw has been caught in the trap, the object of the invention being to provide an improved stiffening or auxiliary spring of this character which is simple in construction and which can be readily applied to and used in connection with the spring of a trap.

The invention consists in the construction, combination and arrangement of devices hereinafter described and claimed.

In the accompanying drawings:—

Figure 1 is a detailed elevation of a trap provided with a stiffening spring constructed and arranged in accordance with my invention.

Fig. 2 is a detailed plan of the same.

Fig. 3 is a detailed perspective view of my improved stiffening spring.

For the purposes of this specification the base of a trap is shown at 1, the jaws at 2 and the usual spring for closing the jaws when the trap is sprung at 3. This spring has diametrically enlarged eyes 4 at its ends as is usual.

In accordance with my invention I provide a stiffening spring 5 which is substantially V-shaped and which is adapted to be arranged between the arms of the spring 3. The spring 5 is provided at its ends, which bear against the opposing sides of the arms of the spring 3, with outwardly-turned flanges 6 which engage the side edges of the spring 3 at points near the eyes 4. The spring 5 serves to stiffen and reinforce the spring 3 and to greatly increase the efficiency of the latter in closing the jaws of the trap and holding the same in closed position. The flanges 6 and the broadened eyes 4 of the trap spring 3 prevent endwise movement of the stiffening spring, as will be understood, so that the stiffening spring is securely held in place and is not liable to become casually detached.

While I have herein shown and described a preferred form of my invention, I would have it understood that changes may be made in the form, proportion and construction of the several parts, without departing from the spirit of my invention and within the scope of the appended claim.

Having thus described my invention, I claim:—

In a trap, in combination with a U-shaped spring for closing the jaws of the trap and having arms which narrow toward their outer ends and are provided with diametrically enlarged eyes at said ends, a U-shaped stiffening spring arranged between the arms of the trap spring, bearing thereagainst at its ends and provided at its ends with outwardly-turned flanges which converge toward the outer ends of its arms and engage the side edges of the arms of the trap spring at points near the eyes thereof, said flanges coacting with the eyes to prevent longitudinal movement and casual detachment of the stiffening spring.

In testimony whereof I affix my signature.

CARL A. CARLSON.